United States Patent
Daniel et al.

(10) Patent No.: US 9,460,604 B1
(45) Date of Patent: Oct. 4, 2016

(54) MULTIFUNCTIONAL MODULAR SYSTEM FOR SENSING AND UTILIZING CORPORAL DYNAMICS AND IMPACT RELATED FORCES

(71) Applicants: Isaac S. Daniel, Miramar, FL (US); Jon Oswaks, Miramar, FL (US); Vinh T. Nguyen, Miramar, FL (US); Gary D. Amundson, Miramar, FL (US); Alberto Interian, III, Miramar, FL (US)

(72) Inventors: Isaac S. Daniel, Miramar, FL (US); Jon Oswaks, Miramar, FL (US); Vinh T. Nguyen, Miramar, FL (US); Gary D. Amundson, Miramar, FL (US); Alberto Interian, III, Miramar, FL (US)

(73) Assignee: LEAD TECHNOLOGY CAPITAL MANAGEMENT, LLC

( * ) Notice: Subject to any disclaimer, the term of this patent is extended or adjusted under 35 U.S.C. 154(b) by 249 days.

(21) Appl. No.: 13/925,717

(22) Filed: Jun. 24, 2013

Related U.S. Application Data (63) Continuation-in-part of application No. 13/075,980, filed on Mar. 30, 2011, now abandoned, and a continuation-in-part of application No. 13/744,330, filed on Jan. 17, 2013.

(60) Provisional application No. 61/663,429, filed on Jun. 22, 2012.

(51) Int. Cl.
  *G09B 21/00* (2006.01)
  *G08B 21/18* (2006.01)

(52) U.S. Cl.
  CPC .................................... *G08B 21/18* (2013.01)

(58) Field of Classification Search
  CPC ........ G08B 1/08; G08B 13/14; G08B 23/00; G08B 1/081; G08B 21/18; G06F 17/00; G06F 7/04; G01F 17/00; A61B 5/00; H04Q 1/00; H04N 5/2224
  USPC ...... 340/4.1, 572.1, 479, 539.32, 5.2, 573.1, 340/825.19; 600/300, 544; 607/57, 46; 702/55; 235/492, 385; 348/159; 112/102.5; 700/236; 2/422
  See application file for complete search history.

(56) References Cited

U.S. PATENT DOCUMENTS

| | | |
|---|---|---|
| 5,539,935 A | 7/1996 | Rush, III |
| 6,826,509 B2 | 11/2004 | Crisco, III et al. |

(Continued)

OTHER PUBLICATIONS

Georgia Institute of Technology (May 17, 2005) Portable Tech/ Emory Device Checks for Concussions. www.ScienceDaily.com (Online Magazine) http://www.sciencedaily.com/releases/2005/05/050517064332.htm.

(Continued)

*Primary Examiner* — Steven Lim
*Assistant Examiner* — Sisay Yacob
(74) *Attorney, Agent, or Firm* — Alberto Interian, III, Esq.

(57) ABSTRACT

A sensor module that includes an outer casing configured to be removably inserted into a receptacle in an article of wear or sports equipment, a processor positioned within the outer casing, an accelerometer connected to the processor, a communications module connected to the processor, a proximity sensor connected to the processor, an identifier sensor connected to the processor, wherein the identifier sensor is configured to read an identifier connected to or embedded in an article of wear or sports equipment, and an alert module connected to the processor.

18 Claims, 3 Drawing Sheets

(56) References Cited

U.S. PATENT DOCUMENTS

| | | | |
|---|---|---|---|
| 7,448,751 | B2 | 11/2008 | Kiderman et al. |
| 7,520,614 | B2 | 4/2009 | Joos et al. |
| 7,526,389 | B2 * | 4/2009 | Greenwald et al. ............ 702/55 |
| 7,579,946 | B2 * | 8/2009 | Case, Jr. .................... 340/539.1 |
| 7,720,530 | B2 * | 5/2010 | Causevic ..................... 600/544 |
| 7,731,360 | B2 | 6/2010 | MacDougall |
| 7,819,818 | B2 | 10/2010 | Ghajar |
| 8,001,623 | B2 * | 8/2011 | Gertsch et al. ................... 2/422 |
| 8,593,256 | B2 * | 11/2013 | Isabell ......................... 340/10.1 |
| 2002/0084904 | A1 * | 7/2002 | De La Huerga ........... 340/573.1 |
| 2002/0121986 | A1 * | 9/2002 | Krukowski et al. ..... 340/825.19 |
| 2004/0074966 | A1 * | 4/2004 | Holzer .......................... 235/385 |
| 2005/0177335 | A1 | 8/2005 | Crisco, III et al. |
| 2006/0012471 | A1 * | 1/2006 | Ross et al. .................... 340/479 |
| 2006/0074338 | A1 * | 4/2006 | Greenwald et al. .......... 600/549 |
| 2006/0189852 | A1 * | 8/2006 | Greenwald et al. .......... 600/300 |
| 2006/0261950 | A1 * | 11/2006 | Arneson et al. ........... 340/572.1 |
| 2008/0125288 | A1 * | 5/2008 | Case ................................. 482/1 |
| 2008/0249587 | A1 * | 10/2008 | Cho et al. ....................... 607/46 |
| 2009/0078181 | A1 * | 3/2009 | Liu ............................. 112/102.5 |
| 2009/0292338 | A1 * | 11/2009 | Gordon et al. ................. 607/57 |
| 2009/0314842 | A1 * | 12/2009 | Charrin ......................... 235/492 |
| 2010/0125362 | A1 * | 5/2010 | Canora et al. ................ 700/236 |
| 2011/0210847 | A1 * | 9/2011 | Howard et al. .......... 340/539.32 |
| 2011/0218756 | A1 | 9/2011 | Callsen et al. |
| 2011/0218757 | A1 | 9/2011 | Callsen et al. |
| 2012/0050535 | A1 * | 3/2012 | Densham et al. ............. 348/159 |
| 2012/0075096 | A1 | 3/2012 | Howard et al. |
| 2012/0077441 | A1 | 3/2012 | Howard et al. |
| 2012/0092178 | A1 | 4/2012 | Callsen et al. |
| 2012/0146762 | A1 * | 6/2012 | Agnelli et al. ................. 340/5.2 |

OTHER PUBLICATIONS

Detecting Concussions on the Sidelines—Doctors, Biomedical Engineers Develop Device for Diagnosing Concussion in minutes (Aug. 1, 2005). www.ScienceDaily.com (Online Magazine) http://www.sciencedaily.com/videos/2005/0802-detecting_concussions_on_the_sidelines.htm.

Maruta, Jun, Lee Stephanie W., Jacobs Emily F., Ghajar Jamshid (Oct. 201) A Unified Science of Concussion. (pp. 61-63) Annals of the New York Academy of Sciences. Issue: Psychiatric and Neurologic Aspects of War (Journal) www.braintrauma.org/pdf/maruta2010ann_nyas.pdf.

* cited by examiner

MULTIFUNCTIONAL MODULAR SYSTEM FOR SENSING AND UTILIZING CORPORAL DYNAMICS AND IMPACT RELATED FORCES

PRIORITY CLAIM

The present application is:

a non-provisional patent application based on U.S. provisional patent application Ser. No. 61/663,429, titled "Multifunctional Modular System and Method for Sensing and Utilizing Corporal Dynamics and Impact Related Forces" filed on Jun. 22, 2012;

a continuation-in-part of U.S. patent application Ser. No. 13/075,980, titled "Portable System and Method for Detecting a Neurological Issue," filed on Mar. 29, 2011, which is a non-provisional continuation-in-part of U.S. provisional patent application Ser. No. 61/318,683, titled "System and Method for Detecting a Neurological Issue," filed on Mar. 29, 2010; and a continuation-in-part of U.S. patent application Ser. No. 13/744,330, titled "System and Method for Detecting, Reporting, and Managing Impact Related Injuries," filed on Jan. 17, 2013, which is a non-provisional continuation-in-part of U.S. provisional patent application Ser. No. 61/587,202, titled "MTBI Theory of Operation," filed on Jan. 17, 2012.

The priorities of the aforementioned patent applications are presently claimed, and the entire disclosures of the aforementioned patent applications are incorporated by reference as if fully stated herein.

FIELD

The present disclosure relates generally to electronic systems and methods, and more particularly, to electronic systems and method for measuring corporal dynamics and impacts, and utilizing said measurements for a variety of purposes.

BACKGROUND

Many people suffer from temporary and permanent neurological issues, such as brain injuries, intoxication, motor skill deficiencies, and the like. Often times, people suffering from neurological issues do not become aware it until it is too late and permanent damage may result. Such is the case with people who suffer from concussions.

Concussions are one of the more common forms of brain injury, and may result from wide variety of activities and circumstances, such as car accidents, slip and falls, and sports, such as American football, skiing, biking, hockey, and the like. Some of the symptoms of neurological issues, such as brain injuries, include a lack of motor coordination, variation in pupil sizes, impaired vision due to light sensitivity, blurred vision, and double vision. Hence, in many cases, a person who is suspected to have suffered a brain injury, such as a concussion, is required to visit a medical doctor for diagnosis, since the symptoms of a concussion cannot be easily confirmed by a lay person.

Accordingly, determinations of brain injuries and other neurological issues have been extremely difficult to carry out at the site of an accident or outside of a medical treatment facility. For this reason, medical experts, such as doctors, are required to stand by near a site where a brain injury is likely to occur, such as on the sideline of a football game, or at the base of a ski resort.

Some devices have been developed to aid doctors and medical personnel in determining whether a patient has suffered a brain injury, such as a concussion. Thus far, concussion detection devices have been bulky, requiring large computing equipment and eye measurement devices, and have required that patients wear pieces such as eye-goggles, head visors, electrodes, and the like, thus making the devices ineffective in field testing where patients are required to be tested for concussions quickly and without having to remove equipment that the patient is already wearing, such as in the case with American football players, which often times have to run to the sideline to be checked for a concussion and then run right back into a game to continue playing, with no time to remove and readjust their helmets, gloves, and the like. Furthermore, for some brain trauma patients, it is desirable to be able to test them for brain injuries without having to remove equipment they already are wearing out fear that removing the equipment would cause further injury.

Further such systems have not provided ways of improving player performance or training tools.

SUMMARY

The various embodiments of systems and methods described herein result from the realization that the presence of a neurological issue may be determined in a convenient and easy-to-use manner by providing a system and method that identifies athletes, associates them with a reporting unit, collects impact related data with the reporting unit, collects cognitive measurements of the user, reports the impact related data, cognitive measurements, or user data to a plurality of recipients, including team personnel, medical personnel, family, and league officials via a virtual private network, and flags the user or the reporting device as ineligible for participation in an activity, such as sport, game, or military action.

Accordingly, the various embodiments and disclosures described herein solve the limitations of the prior art in a new and novel manner.

DETAILED DESCRIPTION OF PREFERRED EMBODIMENTS

Referring to FIGS. 1A-1E, a sensor module 100 for sensing and utilizing corporal dynamics and impact related forces is shown in accordance with one embodiment, wherein sensor module 100 comprises an outer casing 102 configured to be removably inserted into a receptacle 101 in an article of wear or sports equipment 103, a processor 104 positioned within outer casing 102, an accelerometer 106 connected to processor 104, a communications module 108 connected to processor 104, a proximity sensor 110 connected to processor 104, an identifier sensor 112 connected to processor 104, wherein identifier sensor 112 is configured to read an identifier 113 connected to or embedded in an article of wear or sports equipment, and an alert module 114 connected to processor 104.

Accordingly, in some embodiments, sensor module 100 may be capable of being received by a standard receptacle on a variety of articles of wear or sports equipment, wherein the sensor module 100 may comprise a processor, at least one accelerometer, a communications module, a proximity sensor, and a an alert means, such as a vibrator, speaker, light (LED), or alert signal transmission means.

The sensor module 100 may be formed such that it can fit in the receptacle 101, or attached to the article of wear or sports equipment 103, wherein a variety of articles of wear or sports equipment may each include a receptacle 101 formed to removably accommodate the sensor module 100 such that the sensor module 100 can sense the dynamics and impacts that affect the body part(s) to which the articles of wear or sports equipment 103 is attached. The article of wear or sports equipment 103 may comprise any type of article of wear, such as a sporting article of wear, which may include a helmet, a headband, a wristband, an armband, a belt, a buckle, a glove, a necklace, belt clip, a glove, a racket, a bat, a stick, and the like. For simplicity, the system will be described heretofore in relation to articles of wear, however it should be understood that articles of wear may be substituted with sports equipment with regards to the various embodiments described herein.

The receptacle 101, or material surrounding the receptacle 101, may be padded or thick enough to allow a user of the article of wear 103 and sensor module 100 to wear the article of wear 103 and sensor module 100 comfortably. At the same time, however, the receptacle 101 may be positioned on the article of wear 103, and the material making up or surrounding the receptacle 101 may be formed, such that the dynamics and impacts related with the body part to which the article of wear 103 is attached may be measured effectively. For example, in a helmet, the sensor module 100 may be placed near or against a user's forehead. For a headband, the sensor module 100 may be placed near or against the back of the user's head.

Figure 1A:
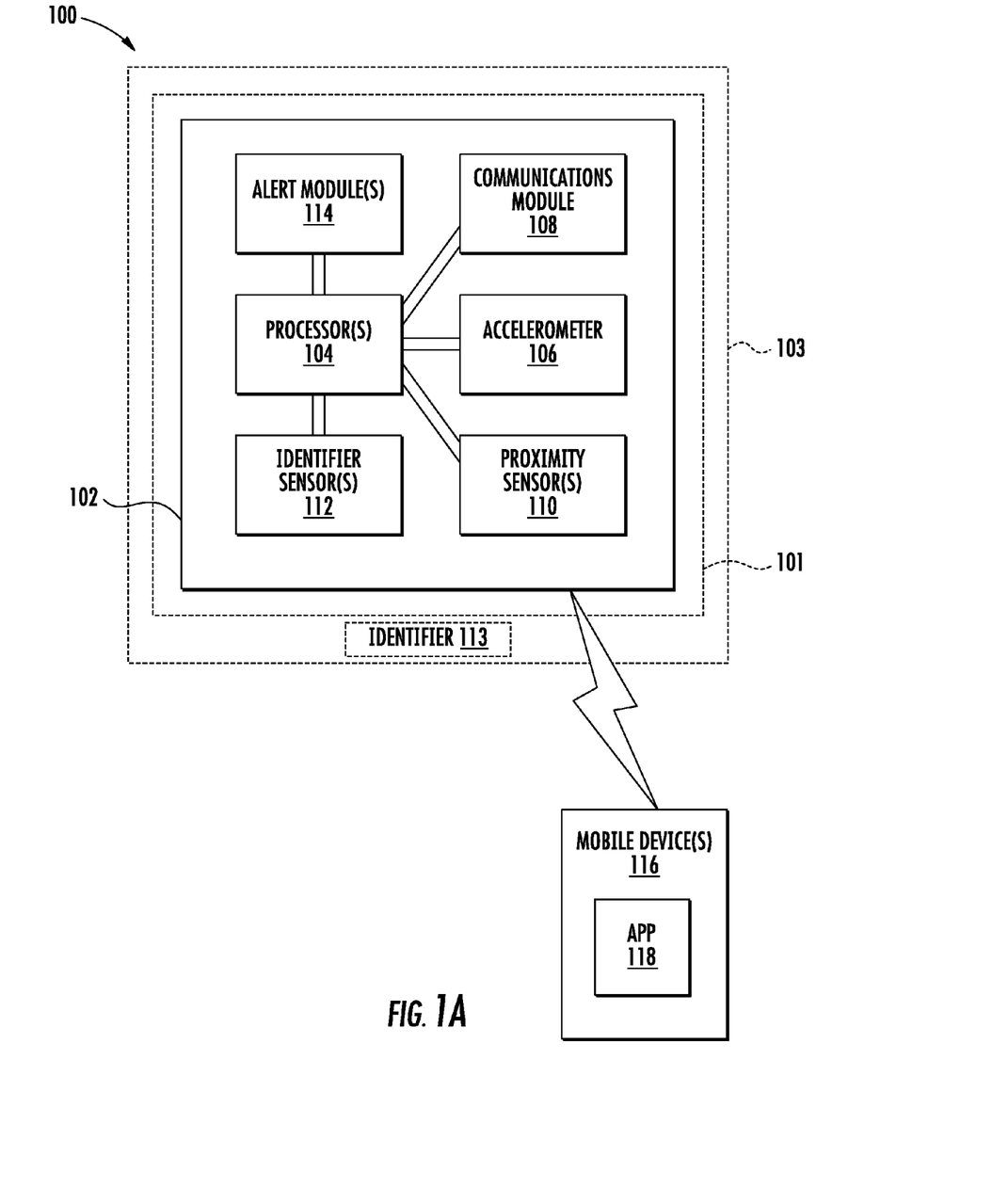
FIG. 1A shows a sensor module in accordance with one embodiment.
Figure 1B:
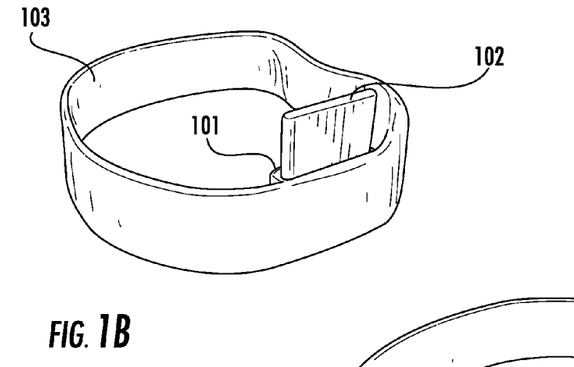
FIG. 1B shows a sensor module and an article of wear or sports equipment in accordance with one embodiment.
Figure 1C:
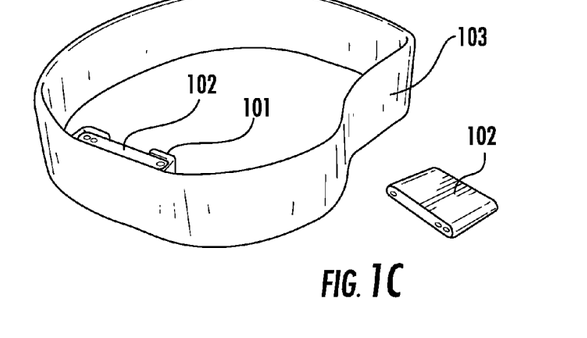
FIG. 1C shows a sensor module and an article of wear or sports equipment in accordance with another embodiment.
Figures 1D, 1E:
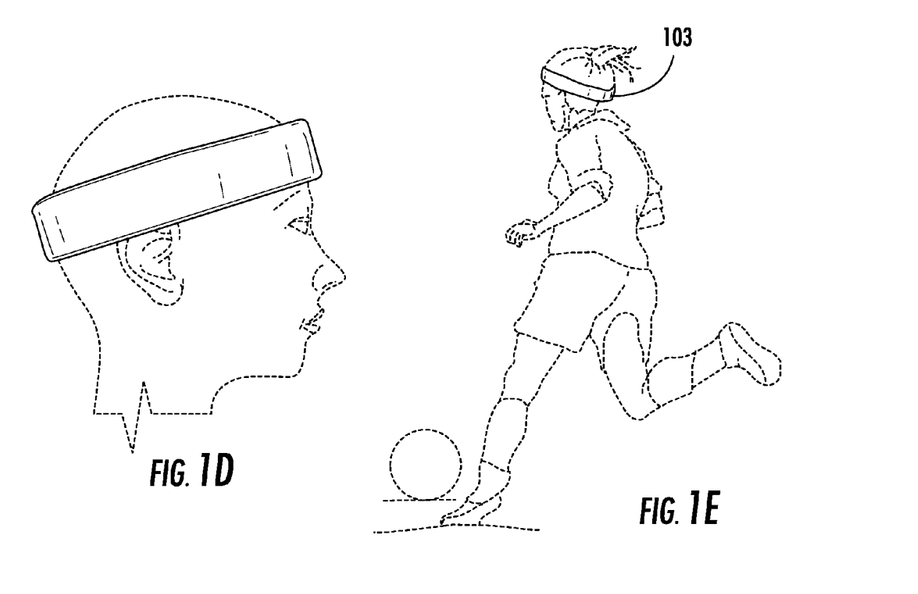
FIG. 1D shows an article of wear or sports equipment in accordance with yet another embodiment.
FIG. 1E shows an article of wear or sports equipment in accordance with yet another embodiment.

The processor 104 may comprise any type of processor, such as a microcontroller, a single core processor, a multi-core processor, and the like.

The communications module 108 may comprise a wireless communications module, such as, but not limited to, a Bluetooth™ module, a WiFi module, a wireless local area connection module, a Zigbee™ module, a GSM module, and the like. The communications module 108 may be used to wirelessly communicate with a mobile device 116, wherein the mobile device 116 may be running computer executable instructions, such as an application 118 to allow a user to control, program, and/or receive or transmit data to/from the sensor module 100. Application 118 may comprise a mobile application, such as a downloadable mobile application.

In another embodiment, the sensor module 100 may comprise a means for wired communication, such as a micro, mini, or standard USB connection, which may be used to connect the sensor module 100 to a PC, wherein the PC may serve the function of the mobile device 118 in the system by running a similar application. The communications module 108 may also be used to power the sensor module 100, such as a 4 conductor 3.5 mm audio jack to charge power and transmit data via data connection (e.g. USB).

For example, a user may (via the application 118) set an acceleration threshold (measured in G's) required to trigger an alert. In this case, if a body part of the user experiences an acceleration greater than the threshold, an alert may be transmitted (automatically or upon request) to the mobile device 116 from the sensor module 100, and/or an alert may be transmitted via the alert module 114 in the sensor module 100. By setting a threshold, users may be alerted that a threshold has been exceeded, and the user may be professionally checked for injuries that may have occurred, such as a concussion, and the user of the sensor module 100 may be alerted to stop playing and to be evaluated by a professional.

Alert module 114 may comprise a visual, tactile, and/or audible alert module, such as a speaker, light, or vibrator.

In some embodiments, the application running 118 on the mobile device 116 may be configured to offer additional features, such as disabling alerts, disabling alert module 114, informing a user how many times a user of the sensor module 100 has been hit or has performed certain motions (e.g. swings, punches, shots), allowing a user to access a history of readings, displaying where an impact was sustained and how hard it was, allowing a user to create user (i.e. user) profiles and histories, accessing a database or server system wherein data collected by the sensor module 100 can be uploaded and the user can see data collected by other users, allowing the user to choose what type of article of wear 103 the sensor module 100 is connected to and presenting the user with options and/or functionality that corresponds to the article of wear 103 currently being used, and the like. For example, a baseball catcher may have a sensor module 100 connected to their mitt to let a pitcher know how fast the pitcher is throwing the ball.

Accordingly, the application 118 may comprise a graphical user interface for displaying information to a user and for receiving user input related to the programming, operation, and manipulation of the sensor module 100 or any data collected therefrom.

In one embodiment, the system and sensor module 100 may include a means for automatically identifying what type of article of wear 103 it is connected to, and upon having identified the type of article of wear 103, the application 118 on the phone may modify or adjust settings or automatically present the user with options/functionality that correspond to the article of wear 103. For example, if the article of wear 103 is a boxing glove, the user may be presented with the option to see how many punches have been performed, and if the sensor module 100 is subsequently connected to a football helmet, the user may be presented with the option to see how many hits the helmet sustained. The user-settable functions may also vary according to type of article of wear 103. For example, when the sensor module 100 is connected to a football helmet, the user may be able to set an impact threshold as well as a number of hits threshold. If the sensor module 100 is connected to a boxing glove, a user may be able to set a punch count threshold. If the sensor module 100 is connected to a soccer headband, the user may be able to set an impact threshold or number of times a soccer ball has been headed. Any sports motion or impact may be programmed according to the type of article of wear 103 the sensor module 100 is connected to. Another example consists of using the module in two different helmets, such as a football helmet and a hockey helmet, wherein impact thresholds may differ due to the fact that either helmet may provide more protection for the user.

The means for automatically identifying what type of article of wear 103 the sensor module 100 is connected to may comprise a radio frequency identification ("RFID") tag embedded in or connected to the article of wear, and a RFID tag reader in the identifier sensor 112 may be operative to read the RFID tag in an article of wear 103. A particular type of article of wear may have a unique ID associated with that type of article of wear so that certain settings or statistics may be associated with the type of article of wear. Additionally, a specific article of wear may have a unique ID associated with that specific article of wear, so that certain settings or statistics may be associated with the specific/unique article of wear. In other embodiments, the means for automatically identifying the type of article of wear may comprise any other such means, such as magnetic material, wherein the magnetism of the magnetic material may be associated with the article of wear, a visual image, such as a barcode, wherein the visual image may be associated with the article of wear, an identification chip, metallic thread woven into the fabric of a body of the article of wear 103, wherein the fabric may woven in a particular pattern associated with that type of article of wear, computer chips, and the like. Accordingly, the identifier sensor 112 may comprise an RFID reader, a magnet or magnetic sensor, a metal detector, a camera, and the like. Further, in some embodiments, sensor module 100 may comprise computer executable instructions readable by the processor and configured to use identifier sensor 112 to read identifier 113 and identify a type of article of wear or sports equipment.

The proximity sensor 110 in the sensor module 100 may be used to determine whether the sensor module 100 is connected to an article of wear 103 and whether the article of wear is being worn by a user. In one embodiment, proximity sensor 110 may be used to determine whether a helmet (to which the sensor module is connected) is being worn, and thus the sensor module 100 may be able to record the accelerations. By detecting when the article of wear 103 or sensor module 100 is being worn, false measurements can be avoided and battery life can be extended, since the sensor module 100 can be programmed to measure or record acceleration and/or transmit data only when it is being worn.

In some embodiments, the computer executable instructions may be configured to activate or deactivate the processor 104, the accelerometer 106, the communications module 108, the proximity sensor 110, the identifier sensor 112, or the alert module 114 based on whether the sensor module 100 is being worn by a user.

When the sensor module 100 is not connected to an article of wear 103, or if the article of wear 103 is not being worn, the sensor module 100 may automatically enter a low-power consumption "sleep-mode" or may shut down any or all of its components.

If the sensor module 100 and the article of wear 103 is being worn, but the sensor module 100 is not connected to the mobile device 116, the sensor module 100 may enter a "record mode," wherein any measurements taken by the sensor module 100 may be recorded and stored on a local storage medium, such as a memory module, and when the sensor module 100 subsequently connects to the mobile device 116 (or PC) the sensor module 100 may transmit the recorded measurements to the mobile device 116.

The accelerometer 106 may be any type of accelerometer, such as a single axis, a multi-axis accelerometer, a rotational axis accelerometer, or any combination thereof. In one embodiment, the sensor module 100 may comprise additional types of sensors or electronics, such as gyroscropic sensors (which may include a gyroscope), a compass, a global positioning system module, and the like. The addition of these features may allow the sensor module 100 to be used to capture and record data related to sport motions, such as swings, punches, and the like, which may be recorded and analyzed for training purposes. Any of the various sensors described herein may be used to determine or calculate the angular acceleration felt by a body part of the user, such as head, brain, and the like.

In some embodiments, the identifier 113 or identifier sensor 112, may be used to associate an article of wear 103 with a sensor module 100 and/or a user, and which may be used to record/and or track how many impacts or motions, as well as the intensity of the impacts or motions, a particular article of wear 103, sensor module 100, and/or user has been exposed to over any given period of time.

In some embodiments, the sensor module 100 may comprise a temperature sensor to sense the temperature that a user of the article of wear 103 and sensor module 100 is experiencing. For example, this would allow a system to measure and record the temperature inside a football helmet, the ambient temperature during a game or practice, and/or a temperature of the actual user. A temperature threshold may be set by a user via the application running 118 on the mobile device 116 or PC.

In one embodiment, the sensor module 100 may comprise a satellite communications module, which may be operative to communicate with a satellite based monitoring system, so that the sensor module 100 may be programmed via satellite and data from the sensor module 100 may be collected via satellite, thus allowing for the remote monitoring and programming of the sensor module 100. The remote programming and monitoring of the sensor module 100 may also be achieved by providing a communications network, which may comprise of a wireless local area network connected to a wide area network (e.g. the internet), wherein the sensor module 100 and a monitoring device such as the mobile device 116 or PC may be connected via the communications network.

In yet another embodiment, the sensor module 100 may comprise a power supply or means for connecting a power supply to power the various components of the sensor module 100, such as a battery or a means for charging a battery. The sensor module 100 may also be connected to a solar power source attached to the article of wear 103 or the user of the sensor module 100, which may be used to charge a battery on the sensor module 100 or power the various components of the sensor module 100. The sensor module 100 may also be connected to a motion harvesting power source, which may be attached to the article of wear 103 or worn by a user of the sensor module 100.

In one embodiment, a plurality of sensor modules 100 may be connected to a single mobile device 116 or PC. This may be beneficial in the case of team sports, where multiple users could be wearing sensor modules 100 and they may be programmed or monitored using a single device, which may be present on a sideline and operated by a user parent, coach, trainer, of medical professional.

In yet another embodiment, the system may comprise of a device for administering a King-Devick test (or similar brain injury test, such as the SCAT 2 test, the ACE test, and the like), such as a kiosk, PC, tablet PC, and the like. In one embodiment, a monitoring system may detect when a sensor module 100 has sensed an impact that has exceeded a threshold, and a user may be required to take a King-Devick test on the sideline to ensure that the user has not suffered a brain injury. The user's identity may be verified by using a biometric identification means, such as a finger print reader. In yet another embodiment, the system may be operative to automatically present a brain injury test on a display device when the sensor module 100 threshold is met or exceeded, wherein the brain injury test may be associated with the user of the sensor module 100.

The user may also be required to take a baseline King-Devick test to determine a baseline score against which futures scores may be measured to determine whether the user has suffered an injury. When the baseline measurement is taken, the user's score may be tied to his identity which, as previously mentioned, may be verified by using a biometric identification means. The King-Devick test may be administered by using an eye-tracking means, such as the Tobii™ eye tracking system, or the King-Devick test may be given by a test administrator, wherein the administrator may use an score keeping card, either physical or electronic, to administer the test.

In one embodiment, the sensor module 100 may also be associated with a certain user. In yet another embodiment, the article of wear or sports equipment 103 (such as a helmet) may also be associated with a certain user. In these embodiments, either or both the sensor module 100 and/or article of wear 103 may comprise a identifier which may be scanned when the user has gone on the field or returned from the field to alert the monitoring system that the user is either active or inactive. The identifiers may be read to verify that the sensor module 100 is connected to the appropriate article of wear 103. In a further embodiment, a user's biometric information may be scanned (such as a fingerprint) to ensure that the user is using the appropriate sensor module 100 and/or article of wear 103.

If a sensor module 100 has sent an impact threshold alert but the user was never cleared or a King-Devick test was never administered or passed, then a second alert may be sent to mobile device 116 or alert module 114 to notify a user that a sensor module 100 has exceeded the threshold attempting to go on the field or has retired from the field without having taken or passed the King-Devick test.

The term "alert" as used herein may refer to any type of alert, which may include, but it not limited to, an audible alert, a visual alert, an electronic alert, a SMS message, tactile alert, an e-mail, and the like.

The results of King-Devick tests taken in conjunction with use of the sensor modules 100 may be stored in a database and analyzed to determine injury data, trends, and the like, which may be used to monitor and prevent injuries to users. Other results of brain injury tests may be used as well (such as the SCAT 2 test, the ACE test, and the like).

In another embodiment, the system may comprise a means for reading the identifiers in sensor modules 100 and/or articles of wear 103 while on the field. The means for reading the identifiers may comprise an RFID reader, or a wireless communications system to wirelessly communicate with the sensor module 100 and read the identifier of the sensor module 100 or article of wear 103. If there is an article of wear 103 or a sensor module 100 associated with an identifier of a sensor module 100 that has previously exceeded a threshold, and which has not been reset or cleared, then the system may provide a second alert, such as via the alert module 114 or a monitoring system, that a uncleared sensor module 100 is currently present on the field.

In one embodiment, the strength, direction, and location of an impact may be calculated by using the process of vector summation, whereby the acceleration measurements taken by the various accelerometers may be summed to determine a sum vector and magnitude, and wherein the sum vector's direction may be traced backwards to determine the direction and location from which the impact came.

Receptacle 113 may comprise any type of means of removably connecting sensor module 100 to article of wear or sports equipment 103, including a pocket, a sleeve, a compartment, hooks and loops fasteners, a button, a zipper, and the like. Accordingly, article of wear or sports equipment 103 may comprise a body, such as a structure, a band, a piece of fabric, a helmet, and the like. In some embodiments, identifier 113 may be connected to article of wear or sports equipment 103 in a manner that if identifier 113 is removed from article of wear or sports equipment 103, then identifier 113 ceases to function as an identifier. This prevents users from swapping identifiers to avoid detection or to allow defective or worn articles of wear or sports equipment 103 to be used. Identifier 113 may be affixed to article of wear or sports equipment 103 in any manner, such as by gluing, stitching, weaving, embedding, and the like.

It should be noted that the various functions and steps carried about by the systems and components disclosed herein may be carried out by computer executable instructions stored on a transitory or non-transitory computer readable medium which are readable by processor 104.

Testing and Calibrating and Programming the Sensor Module

The sensor module embodiments described herein may be tested and calibrated by taking measurements using the sensor module, and then comparing those measurements to measurements taken using pre-calibrated sensors.

In another embodiment, the sensor module may be calibrated for use on different articles of wear or sports equipment by testing the sensor module on a plurality of positions on the articles of wear and determining which positions are most effective for measuring actual impacts or motions from a particular body part. Once the sensor module has been calibrated for a particular article of wear or sports equipment, the calibration settings may be stored for future use. In one embodiment, the calibration settings for the sensor module may change when a user indicates via the application that the sensor module is connected to a particular type of article of wear. In another embodiment, the calibration settings for the sensor module may automatically change when the sensor module automatically detects and identifies what type of article of wear it is connected to, as described above.

Hardware and Operating Environment

This section provides an overview of example hardware and the operating environments in conjunction with which embodiments of the inventive subject matter can be implemented.

A software program may be launched from a computer readable medium in a computer-based system to execute function defined in the software program. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed below.

Figure 2:
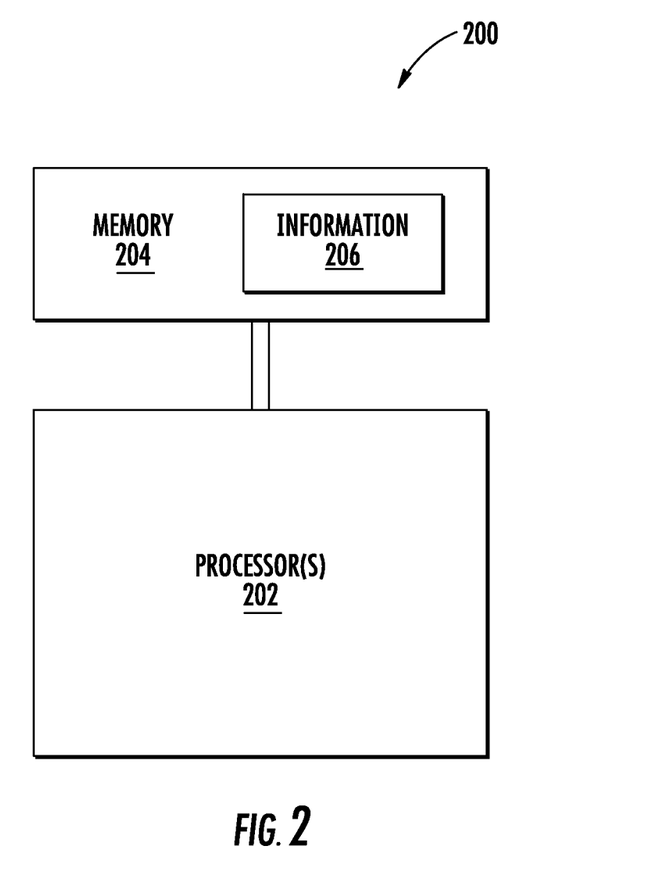
FIG. 2 shows a block diagram depicting an article in accordance with one embodiment.

FIG. 2 shows a block diagram depicting an article 200 comprising hardware and software may be provided in accordance with various embodiments. Such embodiments may comprise a computer, a memory system, a magnetic or optical disk, some other storage device, or any type of electronic device or system. The article may include one or more processor(s) 202 coupled to a machine-accessible medium 204 such as a memory (e.g., a memory including electrical, optical, or electromagnetic elements). The medium 204 may contain associated information 206 (e.g., computer program instructions, data, or both) which, when accessed, results in a machine (e.g., the processor(s)) performing the activities previously described herein.

The principles of the present disclosure may be applied to all types of computers, systems, and the like, include desktop computers, servers, notebook computers, personal digital assistants, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A sensor module comprising:
   an outer casing configured to be removably inserted into a receptacle in an article of wear or sports equipment;
   a processor positioned within the outer casing;
   an accelerometer connected to the processor;
   a communications module connected to the processor;
   a proximity sensor connected to the processor;
   an identifier sensor connected to the processor, wherein the identifier sensor is configured to read an identifier connected to or embedded in an article of wear or sports equipment, wherein the identifier comprises of any one of: a radio frequency identification tar embedded in or connected to the article of wear, magnetic material, a visual image, an identification chip; and
   metallic thread woven into the fabric of a body of the article of wear wherein the fabric may be woven in a particular pattern associated with that type of article of wear; and
   computer chips; and
   an alert module connected to the processor.

2. The sensor module of claim 1, further comprising computer executable instructions readable by the processor and configured to use the identifier sensor to read an identifier connected to or embedded in an article of wear or sports equipment and identify a type of article of wear or sports equipment.

3. The sensor module of claim 2, wherein the computer executable instructions are configured to adjust settings or functions based on the type of article of wear or sports equipment, wherein the settings or functions are related to:
   the processor;
   the accelerometer;
   the communications module;
   the proximity sensor;
   the identifier sensor; or
   the alert module.

4. The sensor module of claim 1, further comprising computer executable instructions readable by the processor and configured to use the accelerometer to measure an acceleration.

5. The sensor module of claim 4, wherein the computer executable instructions are configured use the processor to analyze the acceleration generate acceleration related data.

6. The sensor module of claim 5, wherein the computer executable instructions are configured to use the communications module to transmit the acceleration related data to a computer or mobile device.

7. The sensor module of claim 1, further comprising computer executable instructions readable by the processor and configured to use the alert module to issue an alert if the accelerometer senses a predetermined acceleration reading.

8. The sensor module of claim 1, further comprising computer executable instructions readable by the processor and configured to use the proximity sensor to determine whether the sensor module is being worn by a user.

9. The sensor module of claim 8, wherein the computer executable instructions are configured to activate the processor, the accelerometer, the communications module, the proximity sensor, the identifier sensor, or the alert module if the sensor module is being worn by a user.

10. The sensor module of claim 8, wherein the computer executable instructions are configured to deactivate the processor, the accelerometer, the communications module, the proximity sensor, the identifier sensor, or the alert module if the sensor is not being worn by a user.

11. An article of wear or sports equipment comprising:
    a body;
    a receptacle connected to the body, wherein the receptacle is configured to receive an outer casing of a sensor module; and
    an identifier associated with the article of wear or sports equipment, wherein the identifier is connected to or embedded in the body; and
    configured to be read by an identifier sensor in the sensor module; and
    wherein the identifier comprises a metallic thread woven into a fabric of the body in a pattern, wherein the pattern is associated with a type of article of wear or sports equipment.

12. The article of wear or sports equipment of claim 11, wherein the identifier comprises a radio frequency identification tag, wherein the radio frequency identification tag is associated with a type of article of wear or sports equipment.

13. The article of wear or sports equipment of claim 11, wherein the identifier comprises an image, wherein the image is associated with a type of article of wear or sports equipment.

14. The article of wear or sports equipment of claim 11, wherein the identifier comprises a metallic material.

15. The article of wear or sports equipment of claim 11, wherein the identifier comprises a magnetic material, wherein the magnetic material is associated with a type of article of wear or sports equipment.

16. A computing device comprising:
    a processor; and
    computer executable instructions readable by the processor and configured to:
    receive acceleration related data from a sensor module removably connected to an article of wear or sports equipment;
    receive an identifier from the sensor module, wherein the sensor module is associated with the article of wear or sports equipment;

determine a type of article of wear or sports equipment based on the identifier received from the sensor module read an identifier connected to or embedded in an article of wear or sports equipment, wherein the identifier comprises of any one of: a radio frequency identification tar embedded in or connected to the article of wear, magnetic material, a visual image, an identification chip; and metallic thread woven into the fabric of a body of the article of wear wherein the fabric may be woven in a particular pattern associated with that type of article of wear; and computer chips; and process the acceleration related data based on the type of article of wear or sports equipment.

17. The computing device of claim 16, wherein the processor is connected to or integrated with a mobile device.

18. The computing device of claim 16, wherein the computer executable instructions comprise a downloadable mobile application.

* * * * *